United States Patent Office 3,555,052
Patented Jan. 12, 1971

3,555,052
PROCESS FOR PREPARING SELF-CONDENSATION PRODUCTS
Eiichi Yonemitsu, Takanari Nawata, and Masanobu Masu, Tokyo, Japan, assignors to Mitsubishi Edogawa Kagaku Kabushiki Kaisha, Tokyo, Japan, a corporation of Japan
No Drawing. Filed Aug. 26, 1968, Ser. No. 755,422
Claims priority, application Japan, Aug. 31, 1967, 42/55,474; Apr. 15, 1968, 43/24,745; May 13, 1968, 43/31,692
Int. Cl. C07c 49/62
U.S. Cl. 260—396                                                   13 Claims

ABSTRACT OF THE DISCLOSURE

Self-condensation products of aromatic compounds having a hydroxyl group are prepared by oxidizing with oxygen aromatic compounds having a hydroxyl group in the presence of ruthenium, rhodium, palladium, iridium, platinum or a mixture thereof as catalyst.

---

This invention relates to the preparation of self-condensation products by reacting a compound having a hydroxy group with oxygen in the presence of metal catalyst. More particularly, this invention relates to the preparation of self-condensation products by reacting a compound having an hydroxy group of the formula:

$$X-\left[\underset{R_4\ R_2}{\overset{R_3\ R_1}{\bigcirc}}-O-\right]_n H \qquad (I)$$

where X is a substituent selected from the group consisting of hydrogen, chlorine, bromine, and iodine, $R_1$ is a substituent selected from the group consisting of hydrogen, hydrocarbon radicals, halohydrocarbon radicals and hydrocarbonoxy radicals, $R_2$, $R_3$ and $R_4$ are the same as $R_1$ and, in addition, halogen, $n$ is an integer of not less than one, with oxygen in the presence of a catalyst containing at least one element selected from the group consisting of ruthenium, rhodium, palladium, iridium, and platinum to condense said compound.

Heretofore, some processes for oxidizing monocyclic phenols corresponding to the formula as shown above where $n$ is one with oxygen have been known. They are a process in which amine complexes of metal salts are employed and a process in which an activated manganese is used. Among them, a process of U.S. Pat. No. 3,306,875 is a most practical method, in which phenols are oxidized with oxygen in the presence of a dissolved oxygen carrying intermediate comprising a tertiary amine-basic cupric salt complex to condense the phenols to form polyarylene ethers having a repeating structural unit of the formula:

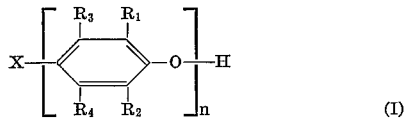

where $R_1$, $R_2$, $R_3$ and $R_4$ are as defined above, or to form diphenoquinones by C—C coupling of a compound of the formula:

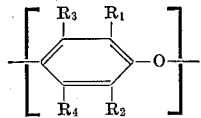

where $R_1$, $R_2$, $R_3$, $R_4$ and X are as defined above.

Since the catalysts of metal salt-amine system in the prior arts are dissolved in the reaction solution, the separation of the catalyst from the reaction mixture is not easy and the repeated use of catalysts is not possible. On the contrary, this invention uses a solid metal catalyst not soluble in the solvent and consequently the separation of the catalyst is easy. Furthermore, the catalyst employed in this invention can be advantageously used repeatedly since the activity of the catalyst is not lost easily.

A certain polyarylene ether of high molecular weight has a high softening point and may be used as a useful thermoplastic synthetic resin known as polyphenylene oxide. Further, diphenoquinones are intermediates for preparing dihydroxy compounds of bisphenol type which are useful as dyestuff and anti-oxidizing agent.

The object of this invention is to provide a novel method for producing polyarylene ethers and diphenoquinones by the oxidizing condensation of phenols or lower polyarylene ethers having a hydroxyl group at the end.

A further object of this invention is to provide a method for producing polyarylene ethers and diphenoquinones by employing a catalyst which can be easily handled as compared with catalysts in the prior art.

Another object of this invention is to provide a method for producing polyarylene ethers and diphenoquinones at a high yield.

Other additional objects of the present invention will become apparent to those skilled in the art by reading the following specification.

The processes of this invention involving oxidative coupling reaction may be illustrated as follows (in the following examples of equations refers to a case where X is hydrogen):

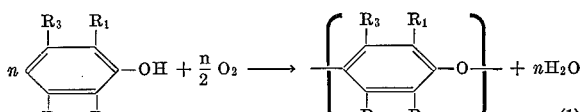

(1)

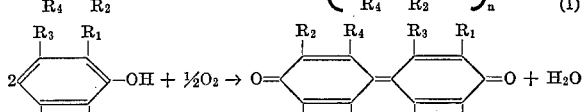

(2)

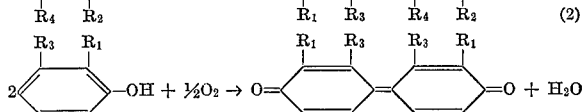

(2′)

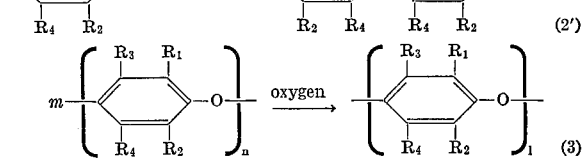

(3)

where $R_1$, $R_2$, $R_3$ and $R_4$ are as defined above, $m$ and $n$ are each an integer not less than two, and $l$ is an integer larger than $n$.

The present inventors have found that ruthenium, rhodium, palladium, iridium and platinum are useful catalysts for oxidative coupling of phenols and polyarylenes having a hydroxyl group at the end.

According to this invention, the oxidation is effected by contacting the starting material, i.e. one or more compounds having a hydroxyl group at the end, with oxygen in a solvent in the presence of a catalyst containing at least one member selected from the group consisting of ruthenium, rhodium, palladium, iridium and platinum. The oxygen may be supplied, for example, by introducing a gas containing oxygen thereinto or by placing an oxygen generating material in the reaction system.

Compounds which can be condensed by the oxidation of this invention may be represented by the Formula I as shown above. Representatives of the compounds where $n$ is one in Formula I are phenol, cresol, 2-ethylphenol, 2-chlorophenol, 2-benzylphenol, 3-phenylphenol, 3-butylphenol, 4-bromophenol, 2,6-dimethylphenol, 2,6-diethylphenol, 2,6 - dipropylphenol, 2,6-dibutylphenol, 2,6-dibenzylphenol, 2,6-dilaurylphenol, 2,6 - dimethoxyphenol, 2,6-diethoxyphenol, 2,6 - ditolylphenol, 2,6-bis(chloroethyl)phenol, 2,6 - bis(chlorophenoxy)phenol, 2,6-bis (phenylethyl)phenol, 3,5 - dimethylphenol, 3,5 - diethylphenol, 3,5-dimethoxyphenol, 2,5 - dimethylphenol, 2,3,6-trimethylphenol, 2,3,5,6 - tetramethylphenol, 2-chloro-6-methylphenol, 2 - allyl - 6 - phenylphenol, 2-methyl-6-butylphenol, 2-methyl - 6 - benzylphenol, 2 - methyl-6-chloroethylphenol, 2,6 - dimethyl-4-chlorophenol, 2,6-dimethyl - 4 - bromophenol, and 2,4 - dichloro-6-methylphenol, etc.

Typical examples of the compounds where $n$ is an integer of at least two in Formula I are polyarylene ethers of low molecular weight having a hydroxy group at the end, which may be prepared by the oxidizing condensation of the phenols as mentioned above, for example: polyphenylene ether, poly(2 - methyl - 1,4-phenylene) ether, poly(2-ethyl-1,4-phenylene)ether, poly(2 - benzyl-1,4-phenylene)ether, poly(2 - butoxy - 1,4 - phenylene) ether, poly(2-chloro - 1,4-phenylene)ether, poly(3 - phenyl-1,4 - phenylene)ether, poly (3-butyl-1,4-phenylene) ether, poly(2,6-dimethyl - 1,4-phenylene)ether, poly (2,6-diethyl-1,4-phenylene)ether, poly (2 - methyl - 6-chloroethyl-1,4 - phenylene)ether, poly(2,6 - diethoxy - 1,4-phenylene)ether, and poly(2,3,5-trimethyl - 1,4 - phenylene)ether, etc.

According to the process of this invention, when the starting materials are phenols wherein $n$ is one in Formula I, the products are mainly diphenoquinones and polyarylene ethers. The ratio of the products to be obtained can be controlled by selecting the reaction conditions as mentioned later. Further, the polyarylene ether products may range from low molecular weight to high molecular weight, and it is also possible to obtain polyarylene ether having weight average molecular weight of as high as 100,000 or higher by selecting appropriate conditions.

When low polyarylene ethers of $n$ being an integer of at least two are used as starting material, the end products are polyarylene ethers of high molecular weight. In general, when polyarylene ethers are obtained by the oxidative condensation of phenols, the molecular weight of polyarylene ethers largely depends on the purity of the starting materials, phenols.

In order to obtain polyarylene ethers of high degree of polymerization, it is necessary to purify sufficiently the starting materials, phenols, and remove impurities. For example, the degree of polymerization of 2,6-dimethylphenol is markedly affected by impurities such as o-cresol, m-cresol, p-cresol, 2,5-dimethylphenol, 3,5-dimethylphenol etc. Therefore, the amount of impurities should be less than 1% of the starting materials so as to obtain practical polyarylene ethers.

According to the process of this invention, it is easy to remove the actalyst from the reaction system and it is possible to use the catalyst repeatedly. Therefore, a starting material which is not so purified may be used to obtain polyarylene ethers having relatively low molecular weight by the process of this invention and the resulting low polyarylene ethers are easily recovered by filtering the catalyst and then the recovered low polyarylene ethers are oxidatively condensed to produce polyarylene ethers having high molecular weight. Polyarylene ethers having low molecular weight are prepared according to this invention by oxidative condensing phenols to some extent, filtering the catalyst, concentrating the solution containing polyarylene ethers of low molecular weight, or diluting the solution with a solvent in which the polyarylene ethers are insoluble, for example, alcohols, to precipitate the polyarylene ethers of low molecular weight. In this case, phenols, impurities, remain in the solution and thereby the polyarylene ethers of low molecular weight are purified. As the polyarylene ethers to be used for further condensation, those of $n$ in Formula I being up to about 40 are convenient for handling.

The catalyst used in this invention is selected from the group consisting of ruthenium, rhodium, palladium, iridium and platinum. These metal catalysts are usually known as reduction catalysts, and in this invention they are also used in a state as used for reducing reactions. That is, the catalyst is used in a state of a reduced metal. The catalyst may be reduced to metal in advance or may be added in the form of oxides, salts etc. to the reaction system and then reduced before the reaction starts.

These metals may be used alone or as a mixture of two or more of them. Further, they may be carried on a carrier or mixed with the other material. Any carrier may be employed unless it completely eliminates the catalytic activity of the metal. In general, one or more metals of lithium, magnesium, calcium, barium, aluminum, titanium, vanadium, chromium, molybdenum, tungsten, manganese, nickel, iron, cobalt, zinc, copper, silicon, tin, boron etc., oxide thereof, metal salts such as barium sulfate and calcium carbonate, activated carbon, silk etc. are used as carriers. These materials may be used by mixing with the metal catalyst in place of using as carrier. These materials work not only as carrier, but also as absorbing agents for by-product impurities. The amount of the active metal in the catalyst may widely vary, and it is preferable that the amount of the active metal is 0.1–10% by weight of the amount of carrier.

The solvents used in this invention are those which dissolve the phenols and the polyarylene ethers, are neither oxidized nor reduced under the reaction condition of the present invention, and do not completely eliminate the activity of the catalyst. As far as the above conditions are satisfied, various solvents may be employed.

Examples of solvents which can excellently dissolve the polymer products are aromatic hydrocarbons, particularly, aromatic hydrocarbons having nine or less carbon atoms such as benzene, toluene, ethylbenzene, xylene, cumene, mesitylene, styrene and the like, nitrated or halogenated aromatic hydrocarbons such as nitrobenzene, dinitrobenzene, nitrotoluene, chlorobenzene, chlorotoluene and the like, and aminobenzenes and derivatives thereof containing nine or less carbon atoms such as aniline, dimethylaniline, diaminobenzene and the like. Examples of solvents other than aromatic compounds are alicyclic hydrocarbons, particularly, containing eight or less carbon atoms such as cycloheptane, cyclohexane and the like, chlorinated hydrocarbons containing three or less carbon atoms such as chloroform, carbon tetrachloride, dichloromethane and the like, and pyridine, t-butylalcohol, t-amylalcohol, dimethylformamide, dimethylsulfoxide, tetrahydrofuran, dioxane etc. In addition, ketones, esters and lower aliphatic acids may be used, but the dissolving power to the polymer products is less than the solvent as mentioned above.

The solvents may be used alone or as a mixture thereof.

In order to obtain polymers having high degree of polymerization, it is preferable to use as the solvent aromatic hydrocarbons such as benzene and the like in which the polymer products can be easily dissolved. Further, it is possible to control the degree of polymerization by mixing appropriately a solvent in which the polymer product is easily dissolved and a solvent in which the polymer product is hardly dissolved.

In the process of this invention, water is produced. When water is present in the reaction system using the solid metallic catalysts, there is a tendency that quinones are predominantly produced. Therefore, if polyarylene ether products are desired, water should be removed from the reaction system. The removal of water thus produced results in improvement of molecular weight, purity, and yield and long persistency of activity of the catalyst.

The produced water may be removed from the reaction system by, for example, absorbing the water to a carrier which has a dehydrating property or adding sodium sulfate, magnesium sulfate etc. as a dehydrating agent. More practical method of removing the produced water which does not disadvantageously affect the catalytic activity comprises azeotropic removing of water by using a reaction solvent capable of forming azeotropic mixture with water or comprises removing the produced water together with the solvent out of the reaction system by condensing the water and solvent vapors contained in the discharge or recycle gas containing oxygen. The mixture of water and solvent in the azeotrope is condensed after being taken out of the reaction system and the water is removed and the solvent may be returned to the reaction system again. It is advantageous to use a solvent having low mutual solubility with respect to water such as benzene, toluene and the like, since the water-solvent mixture taken out together with the discharge gas is easily separated into two layers by condensing and the resulting solvent layer is returned to the reaction system.

When diphenoquinones are particularly desired in the process of this invention, a phenol compound having the formula

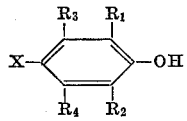

where $R_1$, $R_2$, $R_3$, $R_4$ and X are as defined above, is used as the starting material and the reaction condition is appropriately controlled. It is advantageous for the formation of diphenoquinones to hinder the contact between free radicals and the catalyst after they are formed by contacting the phenols with the catalyst.

For example, the produced water is not removed, but retained in the reaction system, or water is added, or the weight ratio of the catalyst to the starting material is selected to be not higher than two, or a solvent in which the reaction product is hardly dissolved is used. Further, some substituents, for example, substituents causing steric hindrance, favor the formation of diphenoquinones.

The reaction temperature in this invention may widely range depending upon the characteristic of the reactant. Usually a range of $-10°$ C. to $200°$ C. is preferable and a range of $0°$ C. to $130°$ C. is particularly preferable.

Oxidizing agents used in this invention may be oxygen gas, an oxygen-containing gas such as air and the like, and an oxygen-generating material such as ozone, hydrogen peroxide, organic peroxide and the like. Oxygen or oxygen-containing gas is usually used at atmospheric pressure, but may be used at various oxygen pressure to control the rate of reaction.

The life of the catalyst employed in this invention is very long. Therefore, in batch system the reaction mixture is discharged after the reaction is completed while the catalyst is retained in the reaction vessel, and the subsequent reactions can be carried out by using the same catalyst repeatedly. Further, the reaction of this invention can be continuously carried out by employing a cascade system operation. At this point, this invention is better than prior art methods in which a cooper-amine catalyst is used.

The following examples are given by way of illustration and not limitation of some of the methods of this invention. In the examples, parts and percent are by weight unless otherwise specified.

EXAMPLE 1

Oxygen was passed for two hours at a flow rate of 10 l./hr. at room temperature with stirring into a reaction mixture containing 5 parts of 2,6-dimethylphenol, 10 parts of catalyst composed of 1% of palladium metal carried on alumina carrier of 100–150 mesh containing 10% of magnesia, and 50 parts of benzene. A reflux condenser having a separating device at the lower part was fitted to the reaction vessel, and benzene at the upper layer was overflowed into the reaction vessel while water at the lower layer was withdrawn through a cock. After completion of the reaction, the catalyst was filtered to separate and the reaction solution was poured into methanol to precipitate the polymer product. After filtration, the polymer was dried under reduced pressure and the yield was 88%. Intrinsic viscosity of the polymer measured in chloroform at $25°$ C. was 0.95 and the polymer was poly(2,6-dimethyl-1,4-phenylene)ether having a repeating structural unit of the formula as shown below.

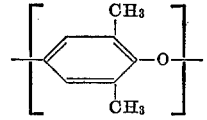

TABLE I

| Item | Example 2 | 3 | 4 | 5 | 6 |
|---|---|---|---|---|---|
| Starting material | 2,6-dimethyl phenol | 2,6-dimethyl phenol | 2,6-dimethyl phenol | 2,6-dimethyl phenol | 2,6-dimethyl phenol. |
| Amount of starting material (part) | 1 | 1 | 5 | 1 | 1. |
| Catalyst | Pd(1%)-Al₂O₃ | Pd(3%)-Al₂O₃ | Pd(1%)-Al₂O₃, MgO | Pd(5%)-BaSO₄ | Pd(2%)-Silicagel. |
| Size of catalyst (mesh) | 100–150 | 100–150 | 100–150 | | 100–200. |
| Amount of catalyst (part) | 10 | 10 | 15 | 10 | 10. |
| Amount of carrier (part) | 10 | 10 | 15 | 10 | 10. |
| Solvent | Benzene | Benzene | Toluene | Benzene | Benzene. |
| Amount of solvent (part) | 30 | 30 | 45 | 30 | 30. |
| Oxidizing agent | Oxygen | Oxygen | Oxygen | Oxygen | Oxygen. |
| Amount of oxidizing agent (part) | Circulation | Circulation | Circulation | Circulation | Circulation. |
| Reaction temperature, $°$ C. | 25 | 25 | 25 | 25 | 25. |
| Reaction time (hr.) | 2.0 | 2.0 | 2.0 | 2.0 | 2.0. |
| Polymer | Polyphenylene ¹ether | Polyphenylene ¹ether | Polyphenylene ¹ether | Polyphenylene ¹ether | Polyphenylene ¹ether. |
| Amount of polymer (part) | 0.778 | 0.778 | 4.37 | 0.522 | 0.699. |
| Yield of polymer (percent) | 79 | 80 | 89 | 53 | 71. |
| [η] dl./gr. $25°$ C. in chloroform | 0.45 | 0.60 | 1.20 | 0.10 | 0.25. |

TABLE I—Continued

| Item | Example 7 | 8 | 9 | 10 | 11 |
|---|---|---|---|---|---|
| Starting material | 2,6-dimethylphenol | 2,6-dimethylphenol | 2,6-dimethylphenol | 2,6-dimethylphenol | 2,6-dimethylphenol. |
| Amount of starting material (part) | 1 | 5 | 5 | 5 | 5. |
| Catalyst | Pd; $Na_2SO_4$[2] | Ru(1%)-$Al_2O_3$ | Pt(1%)-$Al_2O_3$ | Rh(1%)-$Al_2O_3$ | Ir(1%)-$Al_2O_3$. |
| Size of catalyst (mesh) | | 100-150 | 100-200 | 100-200 | 100-200. |
| Amount of catalyst (part) | 0.5 | 15 | 15 | 15 | 15. |
| Amount of carrier (part) | 10.0 | 15 | 15 | 15 | 15. |
| Solvent | Benzene | Benzene | Benzene | Benzene | Benzene. |
| Amount of solvent (part) | 30 | 50 | 50 | 50 | 50. |
| Oxidizing agent | Oxygen | Oxygen | Oxygen | Oxygen | Oxygen. |
| Amount of oxidizing agent (part) | Circulation | Circulation | Circulation | Circulation | Circulation. |
| Reaction temperature, °C | 25 | 50 | 50 | 50 | 45. |
| Reaction time (hr.) | 2.0 | 4.0 | 4.0 | 4.0 | 3.0. |
| Polymer | Polyphenylene[1] ether | Polyphenylene[1] ether | Polyphenylene[1] ether | Polyphenylene[1] ether | Polyphenylene[1] ether. |
| Amount of polymer (part) | 0.217 | 4.14 | 4.23 | 3.06 | 2.95. |
| Yield of polymer (percent) | 22 | 84 | 86 | 62 | 60. |
| $[\eta]$ dl./gr. 25° C. in chloroform | 0.07 | 0.54 | 0.5 | 0.35 | 0.31. |

[1] Poly(2,6-dimethyl-1,4-phenylene) ether.
[2] Pd and $Na_2SO_4$ were added as mixture.

TABLE II

| Item | Example 12 | 13 | 14 | 15 | 16 | 17 |
|---|---|---|---|---|---|---|
| Starting material | 2,6-dimethyl-phenol. | 2,6-dimethyl-phenol. | 2,6-dimethyl-phenol. | 2,6-dimethyl-phenol. | 2,6-dimethyl-phenol. | 2,6-dimethyl-phenol. |
| Amount of starting material (part) | 5 | 5 | 5 | 5 | 5 | 5. |
| Catalyst | Pd(1%)-$Al_2O_3$ | Pd(1%)-$Al_2O_3$ | Pd(1%)-MgO, $Al_2O_3$. | Pd(1%)-MgO, $Al_2O_3$. | Pd(1%)-MgO, $Al_2O_3$. | Pd(1%)-MgO, $Al_2O_3$. |
| Amount of catalyst (part) | 15 | 15 | 15 | 15 | 15 | 15. |
| Amount of carrier (part) | 15 | 15 | 15 | 15 | 15 | 15. |
| Solvent | t-Butyl alcohol | Styrene | Nitrobenzene | Chlorobenzene | Benzene-pyridine | Benzene-chloroform. |
| Amount of solvent (part) | 60 | 60 | 60 | 60 | 55-5 | 55-5. |
| Oxidizing agent | Oxygen | Oxygen | Oxygen | Oxygen | Oxygen | Oxygen. |
| Amount of oxidizing agent (part) | Circulation by blowing. | Circulation by blowing. | Circulation by blowing. | Circulation by blowing. | Circulation by blowing. | Circulation by blowing. |
| Reaction temperature, °C | 40 | 30 | 30 | 30 | 45 | 20. |
| Reaction time (hr.) | 2.0 | 1.9 | 2.5 | 1.9 | 2.65 | 3.50 |
| Polymer | Polyphenylene ether.[1] | Polyphenylene ether.[1] | Polyphenylene ether.[1] | Polyphenylene ether.[1] | Polyphenylene ether.[1] | Polyphenylene ether.[1] |
| Amount of polymer (part) | 2.95 | 4.44 | 4.35 | 4.23 | 4.61 | 4.25. |
| Yield of polymer (percent) | 60 | 88.4 | 90.2 | 86.1 | 93.7 | 86.4. |
| $[\eta]$ dl./gr. 25° C. in chloroform | 0.17 | 0.66 | 0.36 | 0.86 | 0.45 | 0.40. |

[1] Poly(2,6-dimethyl-1,4-phenylene)ether. The examples are given for illustrating various solvents employed.

In the following Examples 18-23, various starting materials are employed.

TABLE III

| Item | Example 18 | 19 | 20 | 21 | 22 | 23 |
|---|---|---|---|---|---|---|
| Starting material | 2-methy-l6-propyl-phenol. | 2-methyl-4,6-dichlorophenol. | 2,6-di-t-butyl-phenol. | Poly(2,6-dimethyl-1,4-phenylene)phenyene) ether.[1] | Poly(2-methyl-6-benzyl-1,4-phenylene)phenylene ether.[2] | 2,4-dimethyl-phenol. |
| Amount of starting material (part) | 5 | 5 | 5 | 5 | 5 | 5. |
| Catalyst | Pd(2%)-magnesia alumina. | Pd(2%)-magnesia alumina. | Pd(2%)-magnesia alumina. | Pd(1%)-magnesia alumina. | Pd(1%)-magnesia alumina. | Pd(1%)-magnesia alumina. |
| Amount of catalyst (part) | 15 | 15 | 15 | 15 | 15 | 15. |
| Amount of carrier (part) | 15 | 15 | 15 | 15 | 15 | 15. |
| Solvent | Benzene | Benzene | Benzene | Benzene | Benzene | Benzene. |
| Amount of solvent (part) | 60 | 60 | 60 | 60 | 60 | 60. |
| Oxidizing agent | Oxygen | Oxygen | Oxygen | Oxygen | Oxygen | Air. |
| Amount of oxidizing agent (part) | Blowing and circulating. | Blowing and circulating. | Blowing and circulating. | Blowing and circulating. | Blowing and circulating. | Blowing into and out. |
| Reaction temperature, °C | 40 | 40 | 25 | 25 | 30 | 25. |
| Reaction time (hr.) | 4.0 | 4.0 | 1.0 | 0.5 | 2.0 | 3.5. |
| Product | Polyphenylene ether.[3] | Poly(2-methyl-chloro-1,4-phenylene) ether. | 2,2',6,6'-tetra-t-butyl diphenoquinone. | Poly(2,6-dimethyl-1,4-phenylene) ether. | Poly(2-methyl-6-benzyl-1,4-phenylene) ether. | Poly(2,6-dimethyl-1,4-phenylene) ether. |
| Amount of product | 2.47 | 1.97 | ([4]) | 4.98 | 4.75 | 4.35. |
| Yield of product (percent) | 50 | 40 | 90 | 100 | 95 | 88.7. |
| $[\eta]$ dl./gr. 25° C. in chloroform | 0.15 | 0.10 | | 0.65 | 0.20 | 0.95. |

[1] $[\eta]$ 25° C. chloroform was used 0.10.
[2] $[\eta]$ 25° C. chloroform was used 0.08.
[3] Poly(2-methyl-6-propyl-1,4-phenylene)ether.
[4] After the catalyst was filtered, the product was washed with methanol and concentrated.

In the following Examples 24–29, amounts of catalyst added and withdrawn when the reaction was repeated 30 times are shown.

TABLE IV

| Item | Example | | | | | |
|---|---|---|---|---|---|---|
| | 24 | 25 | 26 | 27[1] | 28 | 29 |
| Number of repeating | 1 | 2 | 3 | 4 | 29 | 30 |
| 2,6-dimethylphenol (part) | 5.0 | 5.0 | 5.0 | 5.0 | 5.0 | 5.0 |
| Pd(1%)–MgO–Al$_2$O$_3$ charge (part) | 15.0 | 0.8 | 0.8 | 0.6 | 0.7 | 0.6 |
| Amount of catalyst withdrawn after reaction | 0.8 | 0.8 | 0.6 | 0.8 | 0.7 | (0.7) |
| Amount of water withdrawn (part) | 0.3 | 0.9 | 0.71 | 0.72 | 0.73 | 0.71 |
| Benzene | 50 | 50 | 50 | 50 | 50 | 50 |
| Oxidizing agent | (2) | (2) | (2) | (2) | (2) | (2) |
| Reaction temperature, °C | 30 | 30 | 30 | 30 | 30 | 30 |
| Reaction time (min.) | 100 | 100 | 180 | 180 | 180 | 180 |
| Poly(2,6-dimethyl-1,4-phenylene) ether | 4.30 | 4.32 | 4.27 | 4.32 | 4.29 | 4.31 |
| Yield | 87.5 | 87.8 | 86.7 | 87.8 | 87.2 | 87.7 |
| [η] dl./gr. 25° C. in chloroform | 0.95 | 0.65 | 0.60 | 0.63 | 0.65 | 0.60 |

[1] Between Examples 27 and 28, the reaction was repeated 24 times, but the explanation thereof is omitted and only the last two reactions are shown as Examples 28 and 29.
[2] Oxygen blowing.

What we claim is:

1. A process for forming self-condensation products of a compound having a hydroxyl group which comprises oxidizing with oxygen or oxygen-containing gas compound having a hydroxyl group of the formula

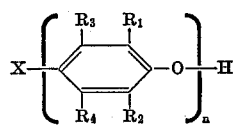

where X is selected from the group consisting of hydrogen, chlorine, bromine, and iodine, R$_1$ is selected from the group consisting of hydrogen, hydrocarbon radicals, halohydrocarbon radicals and hydrocarbonoxy radicals, R$_2$, R$_3$, and R$_4$ are the same as R$_1$ and in addition, halogen and $n$ is an integer of not less than one in the presence of a catalyst containing at least one element selected from the group consisting of ruthenium, rhodium, palladium, iridium, and platinum in a solvent.

2. A process according to claim 1 in which the catalyst is at least one elemental metal selected from the group consisting of ruthenium, rhodium, palladium, iridium and platinum.

3. A process according to claim 1 in which the catalyst is at least one metal selected from the group consisting of ruthenium, rhodium, palladium, iridium and platinum carried on or mixed with at least one member selected from the group consisting of lithium, magnesium, calcium, barium, aluminum, titanium, vanadium, chromium, molybdenum, tungsten, manganese, nickel, iron, cobalt, zinc, copper, silicon, tin, boron, oxides thereof, alkaline earth metal carbonates, alkaline earth metal sulfates, activated carbon and silk.

4. A process according to claim 1 in which the solvent is at least one selected from the group consisting of aromatic hydrocarbons having carbon atoms of not higher than 9, nitro substituted aromatic hydrocarbons having carbon atoms of not higher than 9, halogen substituted aromatic hydrocarbons having carbon atoms of not higher than 9, amino substituted aromatic hydrocarbons having carbon atoms of not higher than 9, substituted amino substituted aromatic hydrocarbons having carbon atoms of not higher than 9, alicyclic hydrocarbons having carbon atoms of not higher than 8, halogenated hydrocarbon having carbon atoms of not higher than 3, pyridine, t-butyl alcohol, t-amyl alcohol, dimethylformamide, dimethylsulfoxide, tetrahydrofuran and dioxane.

5. A process according to claim 1 in which the reaction is carried out while the water produced by the reaction is taken away from the reaction system.

6. A process for preparing polyarylene ethers having a repeating structural unit of the formula

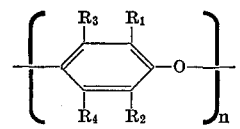

where R$_1$ is selected from the group consisting of hydrogen, hydrocarbon radicals, halohydrocarbon radicals and hydrocarbonoxy radicals, R$_2$, R$_3$, and R$_4$ are the same as R$_1$ and in addition, halogen and $n$ is an integer of not less than 2, which comprises oxidizing with oxygen phenols of the formula

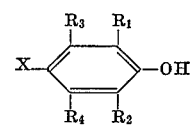

where R$_1$, R$_2$, R$_3$, and R$_4$ are as defined above and X is selected from the group consisting of hydrogen, chlorine, bromine, and iodine, in the presence of a catalyst containing at least one element selected from the group consisting of ruthenium, rhodium, palladium, iridium, and platinum in a solvent.

7. A process for preparing diphenoquinones having at least one formula of

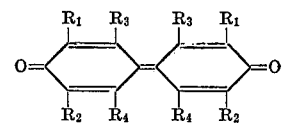

and

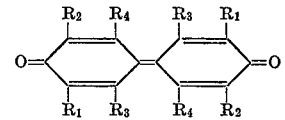

where R$_1$ is selected from the group consisting of hydrogen, hydrocarbon radicals, halohydrocarbon radicals and hydrocarbonoxy radicals, R$_2$, R$_3$, and R$_4$ are the same as R$_1$ and in addition, halogen, which comprises oxidizing with oxygen phenols of the formula

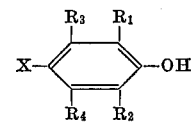

where R$_1$, R$_2$, R$_3$ and R$_4$ are as defined above and X is selected from the group consisting of hydrogen, chlorine, bromine, and iodine, in the presence of a catalyst containing at least one element selected from the group consisting of ruthenium, rhodium, palladium, iridium, and platinum in a solvent.

8. A process for preparing polyarylene ethers having a repeating structural unit of the formula

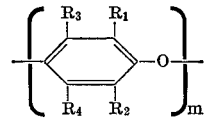

where R$_1$ is selected from the group consisting of hydrogen, hydrocarbon radicals, halohydrocarbon radicals and hydrocarbonoxy radicals, R$_2$, R$_3$, and R$_4$ are the same as R$_1$ and in addition, halogen, $m$ is an integer of not less than 3, which comprises oxidizing with oxygen a compound having a hydroxyl group of the formula

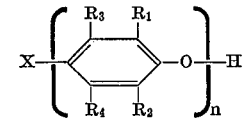

where $R_1$, $R_2$, $R_3$ and $R_4$ are as defined above, X is selected from the group consisting of hydrogen, chlorine, bromine and iodine, $n$ is an integer of 2–40, and $n$ is less than $m$ above, in the presence of a catalyst containing at least one element selected from the group consisting of ruthenium, rhodium, palladium, iridium and platinum in a solvent.

9. A process according to claim 1, wherein the oxidizing is carried out at a temperature of from 0°–130° C.

10. A process according to claim 1, wherein the oxidizing is carried out at a temperature of from 20°–50° C.

11. A process according to claim 2, wherein the catalyst is palladium.

12. A process according to claim 3, wherein the catalyst is palladium.

13. A process according to claim 6, wherein the phenol is 2,6-dimethyl phenol.

References Cited

UNITED STATES PATENTS 3,306,875  2/1967  Hay _____ 260—396

LORRAINE A. WEINBERGER, Primary Examiner

L. A. THAXTON, Assistant Examiner

U.S. Cl. X.R.

260—47, 613